Sept. 25, 1956 C. E. WESCOTT 2,764,344

MECHANICAL BINARY DIGITAL TO ANALOG CONVERTERS

Filed April 14, 1955

INVENTOR.
COE E. WESCOTT

BY
Reynolds, Beach & Christensen

ATTORNEYS

United States Patent Office 2,764,344
Patented Sept. 25, 1956

2,764,344

MECHANICAL BINARY DIGITAL TO ANALOG CONVERTERS

Coe E. Wescott, Seattle, Wash., assignor to Boeing Airplane Company, Seattle, Wash., a corporation of Delaware Application April 14, 1955, Serial No. 501,288

11 Claims. (Cl. 235—61)

This invention relates to a mechanical binary digital to analog converter and more particularly to a device operable to convert binary number information into a corresponding translational position of a movable element. The invention is herein illustratively described by reference to the presently preferred form thereof; however, it will be recognized that the details of construction may vary and that different modifications thereof may be made without departing from the invention concepts.

In its illustrated form the novel mechanical converter is applied to the problem of translating binary number information into a corresponding angular position of a rotatable controlled element. The relative simplicity by which the novel device permits this function to be performed is a primary objective of the invention. Such a device has numerous applications to computers and various control devices wherein it is capable of replacing considerably more complex, expensive and bulky apparatus, which would otherwise be necessary to perform a similar function. The device may be used in a manner permitting the binary number digits to be set into its control elements either manually or automatically, as by telemetering techniques or the like; also rotational movement of the controlled element to the command position determined by the binary number setting and detected by the device may be effected manually or by other suitable means. In its simplest aspect, therefore, the device may be used to determine the numerical value of a binary number or to add together mechanically and to represent the summation in terms of shaft angle, for example, the numerical values of selected place digits of a binary scale. However, fully automatic control of the settings of the binary control elements in the device and fully automatic control of the positioning movement of the rotatable element are also readily possible, using knowledge common in the art.

The foregoing and other objects, as well as the various features and advantages of the invention, will become evident from the following description thereof by reference to the accompanying drawings illustrating the device and its mode of operation in the preferred form. It will be noted in the drawings that the inventive principles have been illustrated by use of the conventional binary code. It is to be understood, however, that the same principles may also be applied to a nonconventional binary code such as the Gray code disclosed in Gray Patent 2,632,058, March 17, 1953.

Figure 1:
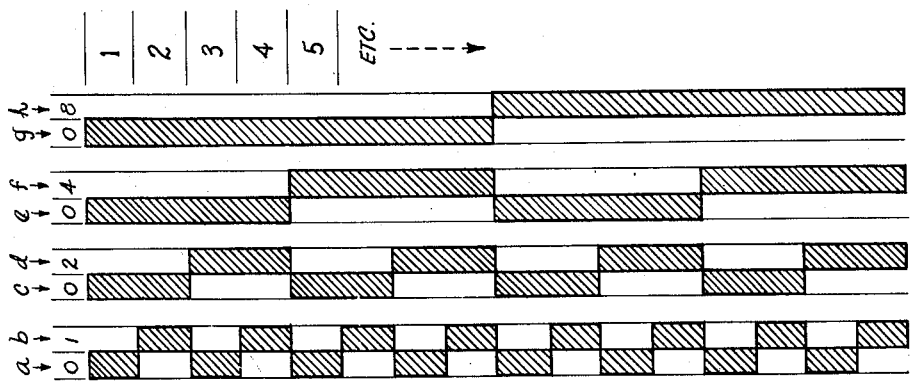
Figure 1 is a graphic representation in the nature of a developmental view of the periphery of the rotor in the device to illustrate the relationship between the projections and recesses formed in the different tracks thereof.

Referring to Figure 1, the eight columns of alternately shaded and nonshaded rectangular areas represent the alternate lands and valleys or recesses on or in track surfaces of the converter rotor. In effect, these columns, designated $a, b, c \ldots h$ constitute a lineal developmental representation of such circumferential track surfaces. It will be noted that these columns are arranged in pairs, and in the example there are four such pairs corresponding to a binary number scale having four digit places. The pair of columns at the left in the figure represent the minor digit place (i. e. that next to the radix point of the binary number to be represented), whereas that at the right represents the major digit place. The column at the left in the figure, designated $a$, has alternate lands and valleys of a length and spacing corresponding to the binary digit zero, whereas the second, adjacent column designated $b$ has alternate lands and valleys of the same length representing the binary digit "one" arranged alternately with the lands and valleys of column $a$. These columns are alternatively selectable at any position along their length in order to represent a zero or a one in the first binary digit place of the scale employed. The interval spacing between successive lands in columns $a$ and $b$ determines the resolution or accuracy of a converter employing the present invention. Similarly, the second pair of columns, designated $c$ and $d$, represent respectively the two possible binary digital values of the second binary place of a number to be represented, namely zero and two, respectively. Likewise the third pair of columns represent the binary digital alternative values in the third binary place of a number, namely zero or four, respectively; whereas the fourth pair of columns are arranged to represent the alternative binary digital values in the fourth binary place of a number, or zero and eight, respectively. It will be noted that with each successive pair of columns the length and spacing in the shaded areas doubles, in accordance with the proportionality of the successive digit places in a binary code. The phasing of lands and valleys in the successive pairs of columns is determined by the conventional binary code relationship. Accordingly, assuming the shaded areas in any column represent the presence of that binary digital value marked at the head of the column, namely zero or one, zero or two, etc., it will be observed that any desired numerical value within the scale employed, namely from one to sixteen may be represented by drawing a line across the columns perpendicular to the length thereof and noting the intersection of such line with shaded areas in the individual columns. If the horizontal or transverse line intersects the shaded areas in all of the zero columns, then the numerical value of the binary representation of the position of that line along the length of the columns is zero. If, on the other hand, the line intersects a shaded area in one or more of the finite value columns, i. e. 1, 2, 4 or 8, the value of that column is added in determining the numerical value represented by the position of the line.

The foregoing in general is the principle employed in the novel converter mechanism by which binary digital information is converted into translational position of a movable element. The different columns are selected in accordance with the binary digits appearing in the respective places of a binary command number, and when a translational position is reached by detector means advancing along the columns such that the detector elements engage the selected combination of shaded and nonshaded areas the device detects that fact and the motion is complete.

The representation in Figure 1 is of the full binary digital number scale for binary numbers expressible to four digit places. This means that there is one shaded area in each of the columns in the fourth pair, two in those of the third pair, four in those of the second pair and eight in those of the first pair. However, it will be recognized that less than the full scale may be sufficient in some cases in which event only a fractional portion of the length of the columns would be employed to represent the desired range of numbers to be converted into translational position. Also the number of places need not be four.

Figure 2:
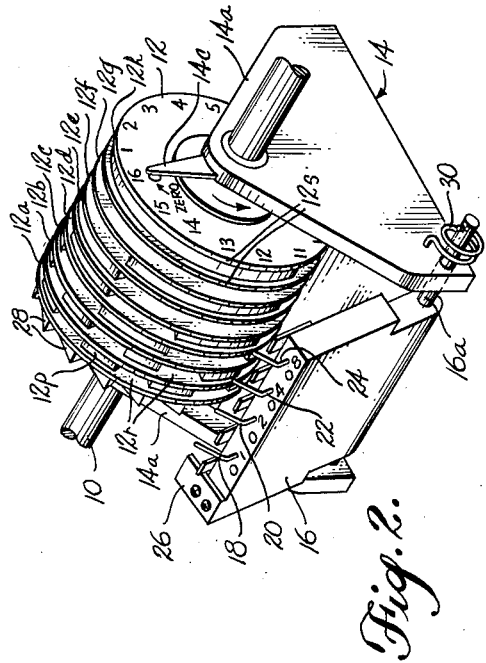
Figure 2 is a perspective view of the novel converter.

Referring to Figure 2, the principles of the invention are illustrated for converting binary digital number information into angular position of a rotatable element such as the controlled shaft 10. Such mechanism in the example comprises a rotor or drum 12 mounted on the shaft 10 to rotate therewith between the stationary end plates 14a of the supporting base 14. The rotor 12 has eight circumferential cam tracks or grooves extending around its periphery designated 12a, 12b . . . 12h, respectively, and the bottom surface of each groove is provided with circumferentially spaced recesses of a length equal to the spacing in each case. The circumferential length and spacing of the recesses or valleys in the first digit-place grooves 12a and 12b correspond to the spacing between successive angular positions of the shaft 10 equivalent to consecutive binary number value increments or bits on the scale to which the mechanism is designed to perform its intended function. In the third and fourth grooves 12c and 12d, representing the second binary place, the length and spacing of the lands and valleys are double that in the first and second grooves. In the fifth and sixth grooves, representing the third binary place, the length and spacing is redoubled, whereas in the seventh and eighth grooves, representing the fourth binary place, it is again redoubled, all as shown schematically in Figure 1. The lands or projections in the groove bottoms are designated 12p, whereas the recesses are designated 12r. The recesses correspond to the shaded areas in Figure 1. Annular separating barriers or retaining ridges 12s extend around the drum 12 on the sides of each groove and project radially outward from the drum beyond the outer surfaces of the projections 12p. The purpose of these separating barriers is to prevent cam follower or contact elements from wandering from one groove to the next during drum rotation as will become clear hereinafter.

It will be noted from the illustration that the first, third, fifth and seventh grooves (12a, 12c, 12e, 12g) each have a recess, one end of which (the counterclockwise end as viewed in Figure 2) is located in circumferential registry with the corresponding ends of a particular recess in the other such grooves. The same is true of the second, fourth, sixth and eighth grooves, 12b, 12d, 12f and 12h, respectively. These particular combinations of recesses for the two sets of columns represent 0000 and 1111, respectively, in terms of the conventional binary code number.

The base 14 carries a member 16 pivoted on a shaft 16a between the base plates 14a. The shaft 16a is parallel to the controlled shaft 10. The swinging edge of the member 16, parallel to the shaft 16a, is disposed to swing toward and from the periphery of the rotary drum 12 and carries the four groove-contacting arms or cam follower elements 18, 20, 22 and 24. These cam follower arms are mounted on the member 16 to swing on parallel pivot axes disposed in a plane generally parallel to the axis of pivot of the member 16 and in individual planes which respectively are located approximately midway between the two track grooves in each of the different pairs on the drum 12. These arms project toward the drum grooves and the first arm in the series, namely 18, may be swung back and forth between alternative settings in which it will ride against the recessed groove surface 12a or 12b. The second such arm may be positioned similarly to ride against the recessed surface of either groove 12c or 12d, the third such arm 22 in groove 12e or 12f and the fourth such arm alternatively in grooves 12g or 12h, respectively. These cam follower arms project laterally from the side of the plate 16 adjacent the drum by a sufficient amount so that all of the projecting ends of the arms can drop into the groove recesses if simultaneously positioned in registry with recesses in the grooves contacted by all such arms. However, since the groove-contacting arms are interconnected by the support member 16 and thereby positionally interrelated in the direction approximately normal to the drum, if the projecting end of any arm contacts a land or projection 12p in the groove in which it is set, none of the arms are free to drop into underlying recesses in the drum tracks. Nevertheless, for each combination of settings of the swinging arms 18, 20, 22 and 24, corresponding to a particular command binary number, there will be a unique angular position of the drum 12 at which the member 16 may be pressed toward the drum and the ends of the arms will be free to drop into the groove recesses underlying them. This advance of the support 16 toward the drum axis serves as a means of detecting arrival of the drum at the selected position. In Figure 2 one end of the drum 12 has been marked with identifying numerals ranging from one to sixteen, which are circumferentially so related to the circumferential point at which the arms 18, 20, etc. contact the track grooves that the fixed index marker 14c will point to the correct number on the scale to register the summation of the values of the respective binary places to which the individual track contact elements 18, 20, etc. have been set when the arms drop into groove valleys as described above.

A pawl 26 carried by the swinging support 16 at one end thereof is disposed for engagement with the teeth 28 formed on one end of the drum 12. The teeth are circumferentially spaced at the same interval as the lands and valleys in track grooves 12a and 12b and in the example there are sixteen teeth in all. These teeth serve as positive stops for the drum in any of the numerically represented positions of the latter. Engagement of the pawl 26 with a tooth 28 stops the drum and prevents damage to the contact arms 18, 20, etc. Also such engagement provides a discrete precisely determined stopping point for the drum in each numerically represented position. For that purpose one edge of each tooth 28 is formed to extend radially in relation to the drum for positive engagement with the pawl 26, when the drum is rotated in one direction. The opposite edge of each tooth is sloped toward the next tooth, as shown. In the example the teeth are formed so that positive stopping action for each numerically represented position of the drum, produced by the radial teeth edges, is effected by counterclockwise rotation of the drum (as viewed in Figure 2).

A spring 30 connected at one end to the base 14 and at its opposite end to the shaft 16a hence to the member 16 biases the latter toward the drum 12 so as to cause the contact arms 18, 20, etc. to drop into the track recesses at the appropriate position of the drum. Other biasing means, including gravity or manual pressure, may be used to suit different applications of the device.

Figure 3:
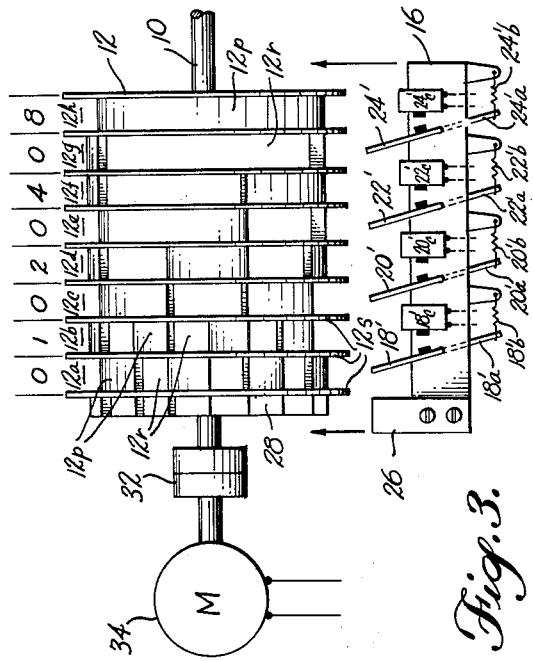
Figure 3 is a plan view of the converter shown in Figure 1 and including certain additions thereto.

In Figure 3 the drum 12 is arranged to be driven through a slipping clutch 32 by a motor 34. The energizing circuit and controls therein causing the motor to be operated for rotating the drum are not illustrated. Whereas in Figure 2 the contact arms 18, 20, etc. are arranged to be set manually to represent the numerical values of the binary digit places of a binary number to be translated into shaft position, in Figure 3 a means is illustrated for accomplishing this result electrically. In this case the arms 18′, 20′, 22′ and 24′ are components of individual lever systems having oppositely projecting arms 18′a, 20′a, 22′a and 24′a, respectively. Springs 18′b, 20′b, 22′b and 24′b interconnect the respective oppositely projecting arms with anchor elements on the support member 16 to bias the contact arms into corresponding positions, preferably those representing the zero digits for the respective binary places with which the contact arms are associated. Solenoids 18′c, 20′c, 22′c and 24′c, mounted on the support 16 are arranged to attract the arms into the opposite or "one" settings when energizing current is passed through such solenoids, overcoming the force of the bias springs. Suitable control circuits for energizing the solenoids either automatically or by manual control are obtainable but are not illustrated herein since they involve well known principles of electrical design and do not in themselves form a part of the present invention.

I claim as my invention:

1. Mechanical means for converting binary code digit values into a corresponding translational position of a movable element, comprising in combination with the movable element, a base, means on said base guiding said movable element to permit translation thereof relative to said base through a succession of translational positions corresponding to binary code consecutive number values, and means operable to detect arrival of said movable element at a selected tranlational position comprising means forming a plurality of parallel tracks arranged in pairs to represent the different binary code digit places and operatively connected to said movable element to move therewith lengthwise of said tracks, the two tracks in each pair having alternate lands and valleys of substantially equal length thereon arranged in series along the length thereof, with the valleys in one such track being positioned in substantial registry with the lands in the other such track of the same pair, and with the valleys and lands of each such track pair bearing a relationship of length and position to those of the other pairs of tracks as the related values and relative positional sequence phasings, respectively, of the binary code digit places represented by said pairs of tracks, such that the lands of one track in each pair represent the binary "one" digit and the lands of the other track in the same pair represent the binary "zero" digit for the same binary digit place, a plurality of track contact elements associated with the respective track pairs, means connected to said base locating said contact elements as a group to engage the respective tracks at corresponding locations along the length of said tracks, said locating means permitting selective positioning of said individual contact elements to ride on one track or the other of the associated pair a binary number to be represented by the selected translational position of the movable element, and means interconnecting said contact elements to permit movement thereof simultaneously toward and from said tracks, whereby engagement of any such contact element with a land prevents positioning of said contact elements in the valleys of the respectively associated tracks whereas simultaneous registry of all contact elements with valleys permits positioning of said contact elements simultaneously in said valleys thereby to detect translational positioning of the movable element in accordance with the binary number to be represented.

2. The mechanical converting means defined in claim 1, wherein the interconnected contact elements are biased toward the tracks to advance the respective contact elements into the valleys automatically upon simultaneous registry thereof with valleys in their respectively engaged tracks.

3. The mechanical converting means defined in claim 2, and stop means including a pawl connected to the contact element-interconnecting means for conjoint movement of said pawl with said contact elements toward and from the tracks, and means movable with the tracks having a plurality of teeth thereon extending in series arrangement parallel to said tracks and disposed for engagement by said pawl to arrest movement of the movable element thereby to detect arrival thereof at the selected translational position, said teeth being spaced apart at intervals corresponding to the spacings between successive translational positions of the movable element.

4. The mechanical converting means defined in claim 3, wherein the track contact elements are movable selectively back and forth between alternate positions of engagement thereof with one or the other track of the associated track pair, and wherein the tracks contacted by said contact elements have separating barriers therebetween extending continuously throughout the length thereof and projecting outwardly from the track lands sufficiently to prevent wandering of a contact element from one track to an adjacent track during relative movement of the track means.

5. The mechanical converting means defined in claim 1, wherein the track contact elements are movable selectively back and forth between alternate positions of engagement thereof with one or the other track of the associated track pair, and wherein the tracks contacted by said contact elements have separating barriers therebetween extending continuously throughout the length thereof and projecting outwardly from the track lands sufficiently to prevent wandering of a contact element from one track to an adjacent track during relative movement of the track means.

6. Mechanical means for converting binary code digit values into a corresponding angular position of a rotatable element, comprising in combination with the rotatable element, a base, means connecting said base to permit rotation of said movable element relative to said base through a succession of angular positions corresponding to binary code consecutive number values, and means operable to detect arrival of said movable element at a selected translational position comprising rotary track means having a plurality of circumferentially extending tracks arranged in pairs thereon to represent the different binary code digit places, said rotary means being rotatively connected to said rotatable element to rotate therewith, the two tracks in each pair having alternate lands and valleys of substantially equal length thereon arranged in series along the length thereof, with the valleys in one such track being positioned in substantial circumferential registry with the lands in the other such track of the same pair, and with the valleys and lands of each such track pair bearing a relationship of circumferential length and position to those of the other pairs of tracks as the related values and relative positional sequence phasings, respectively, of the binary code digit places represented by said pairs of tracks, such that the lands of one track in each pair represent the binary "one" digit and the lands of the other track in the same pair represent the binary "zero" digit for the same binary digit place, a plurality of track contact elements associated with the respective track pairs, means connected to said base locating said contact elements as a group to engage the respective tracks at corresponding locations along the length of said tracks, said locating means permitting selective positioning of said individual contact elements to ride on one track or the other of the associated pair a binary number to be represented by the selected translational position of the rotatable element, and means interconnecting said contact elements to permit movement thereof simultaneously toward and from said tracks, whereby engagement of any such contact element with a land prevents positioning of said contact elements in the valleys of the respectively associated tracks whereas simultaneous registry of all contact elements with valleys permits positioning of said contact elements simultaneously in said valleys thereby to detect translational positioning of the movable element in accordance with the binary number to be represented.

7. The mechanical converting means defined in claim 1, wherein the interconnecting means and locating means are provided by a contact element support member mounted on the base to pivot on an axis parallel to the rotational axis of the rotary track means, said support member having a swinging end carrying the contact elements in series arrangement thereon to engage and disengage the tracks simultaneously by pivotal movement of said support member toward and from said rotary track means.

8. The mechanical converting means defined in claim 7, wherein the track contact elements comprise individual arm members projecting from the pivoted support member toward the rotary track means, said arm members being pivotally mounted on said support member to permit swinging of the projecting ends into registry with either track of the associated track pair.

9. The mechanical converting means defined in claim 8, wherein the circumferential tracks contacted by the contact elements have separating barriers therebetween extending circumferentially around the rotary track means and projecting radially outwardly from the track lands sufficiently to prevent wandering of a contact element from one track to an adjacent track during rotary movement of the track means.

10. Binary digital converter means for determining angular position of a rotary element in accordance with a binary code number comprising a base, rotary track means on said base having a plurality of at least four grooves extending circumferentially therearound, one such groove having a surface with a circumferentially extending series of recesses therein of substantially equal circumferential length and spacing corresponding to the angular spacing between successive angular positions representing the consecutive binary number values to be determined, a second such groove having similar recesses therein arranged circumferentially in alternate relation to the recesses in the first groove, and third and fourth such grooves respectively having circumferentially extending series of recesses therein of substantially equal circumferential length and spacing corresponding to twice the angular spacing between successive angular positions representing the consecutive binary number values to be determined, the recesses in said third and fourth grooves being circumferentially arranged in alternate sequence and having ends registering circumferentially with the ends of recesses in the first and second grooves, a plurality of groove-engaging contact elements, and means connected to said base supporting said contact elements in position to ride against the recessed surfaces of the respective grooves, said supporting means permitting selective positioning of one such contact element to ride alternatively in the first or second groove and a second such contact element to ride alternatively in the third or fourth groove.

11. In combination, a plurality of cam follower elements, means supporting said cam follower elements in predetermined serial relationship, track means having a plurality of pairs of cam tracks thereon corresponding to the number of cam follower elements, means mounting said track means to permit translational movement thereof lengthwise of said tracks relative to said cam follower supporting means, said cam follower supporting means disposing said cam followers and permitting adjustable positioning thereof selectively to place each cam follower element in riding contact with either cam track of a particular track pair on said track means, each cam track having lands and valleys thereon engageable in alternate succession by a cam follower element accompanying said track means relative movement, the length and spacing interval of such lands and valleys in the tracks of each pair being equal and the lands of one such track in each pair being arranged in alternate succession with those of the other such track in the same pair, and the length and spacing interval of such lands and valleys in the different pairs differing by multiples of two in a binary code arrangement, said cam follower supporting means permitting movement of said cam follower elements only simultaneously toward and from said track means.

No references cited.